Jan. 25, 1966   C. E. MELROE ET AL   3,231,117
TRACTOR VEHICLE AND DRIVE THEREFOR
Filed Oct. 23, 1962   8 Sheets-Sheet 2

INVENTORS
Clifford E. Melroe,
Louis J. Keller

BY
Irons, Birch, Swindler & McKie
ATTORNEYS

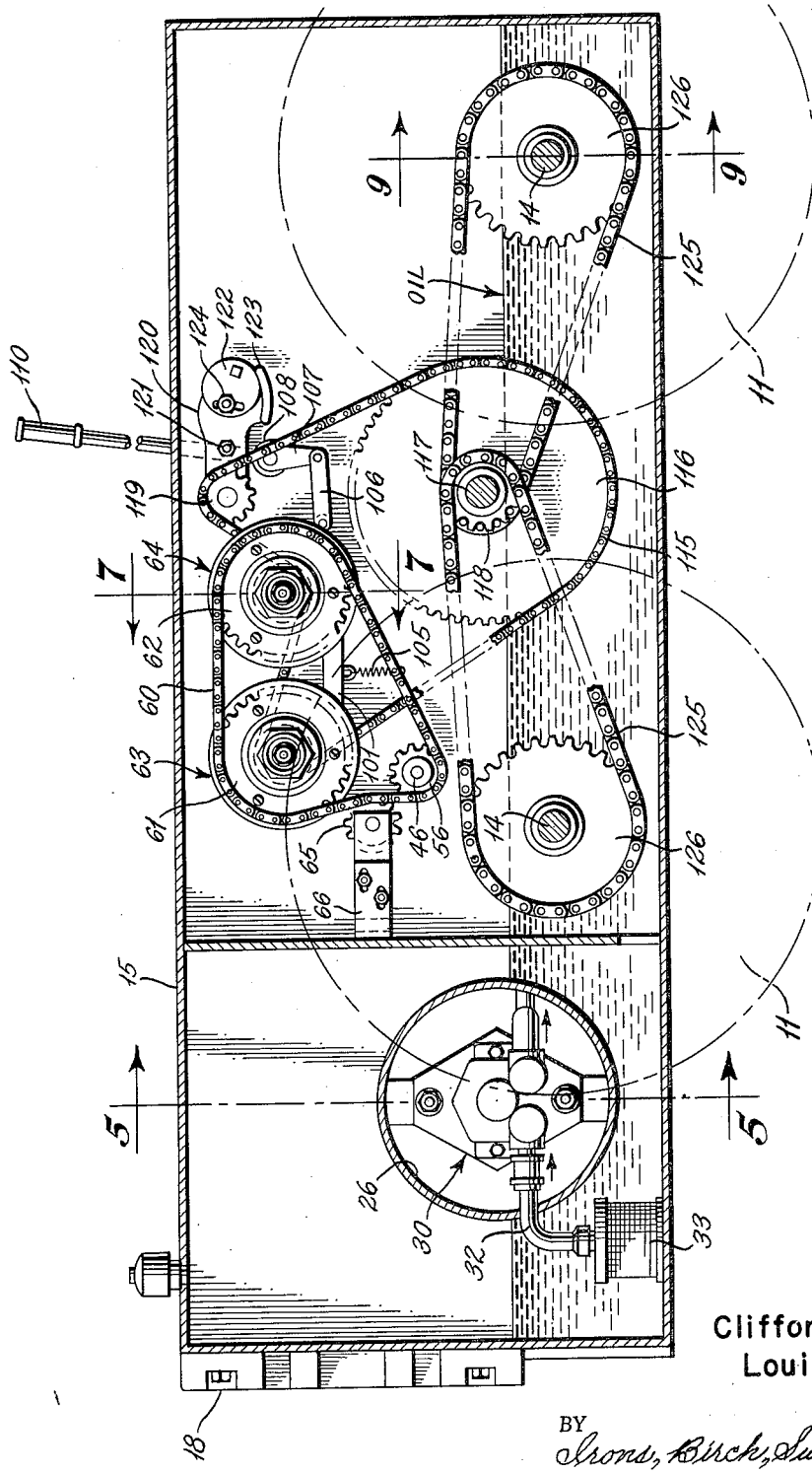

Jan. 25, 1966    C. E. MELROE ET AL    3,231,117
TRACTOR VEHICLE AND DRIVE THEREFOR
Filed Oct. 23, 1962    8 Sheets-Sheet 4
Fig. 5.
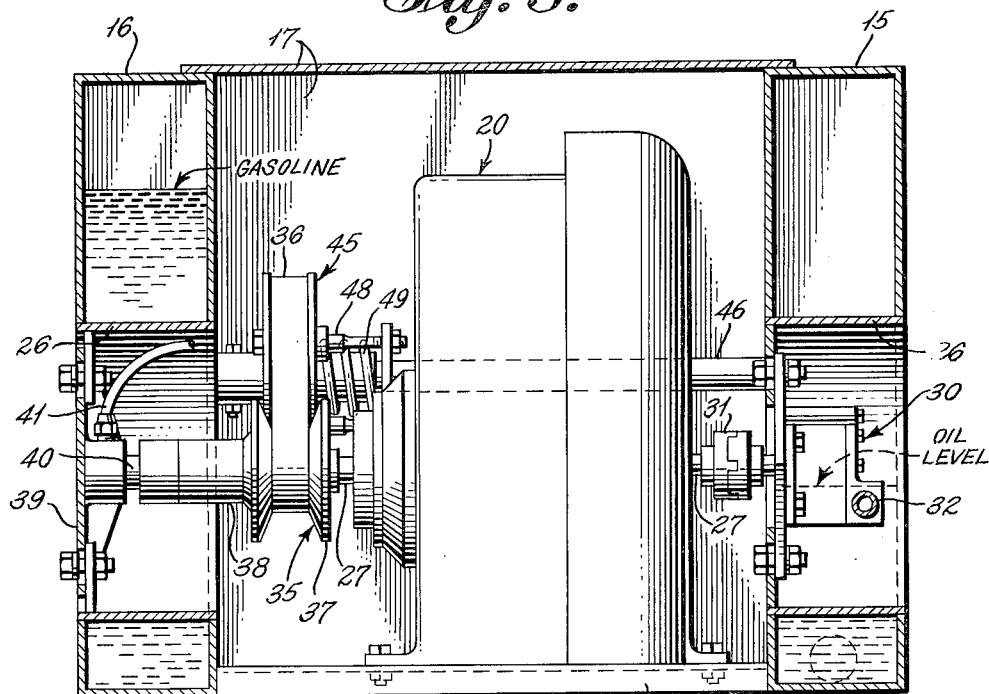
Fig. 6.
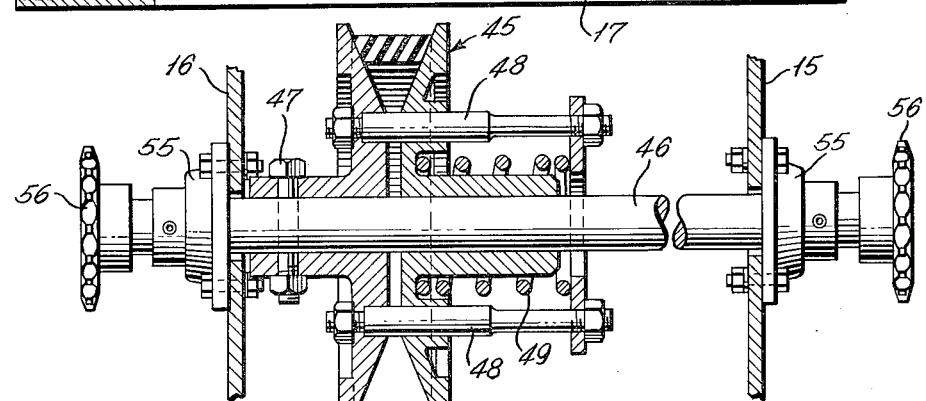
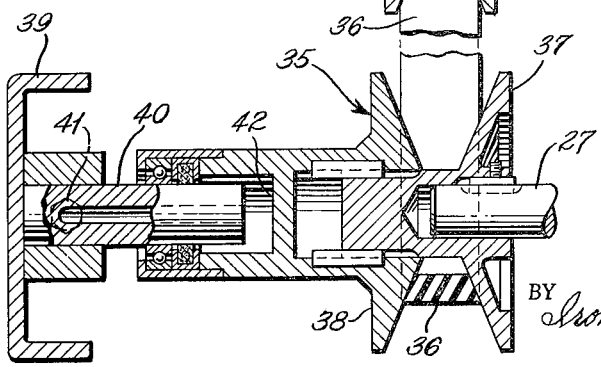
INVENTORS
Clifford E. Melroe,
Louis J. Keller
BY *Irons, Birch, Swindler & McKie*
ATTORNEYS Jan. 25, 1966 C. E. MELROE ET AL 3,231,117
TRACTOR VEHICLE AND DRIVE THEREFOR
Filed Oct. 23, 1962 8 Sheets-Sheet 5

INVENTORS
Clifford E. Melroe,
Louis J. Keller
BY
Irons, Birch, Swindler & McKie
ATTORNEYS Jan. 25, 1966  C. E. MELROE ET AL  3,231,117
TRACTOR VEHICLE AND DRIVE THEREFOR
Filed Oct. 23, 1962  8 Sheets-Sheet 6

INVENTORS
Clifford E. Melroe,
Louis J. Keller
BY Irons, Birch, Swindler & McKie
ATTORNEYS INVENTORS
Clifford E. Melroe,
Louis J. Keller BY Irons, Birch, Swindler & McKie
ATTORNEYS

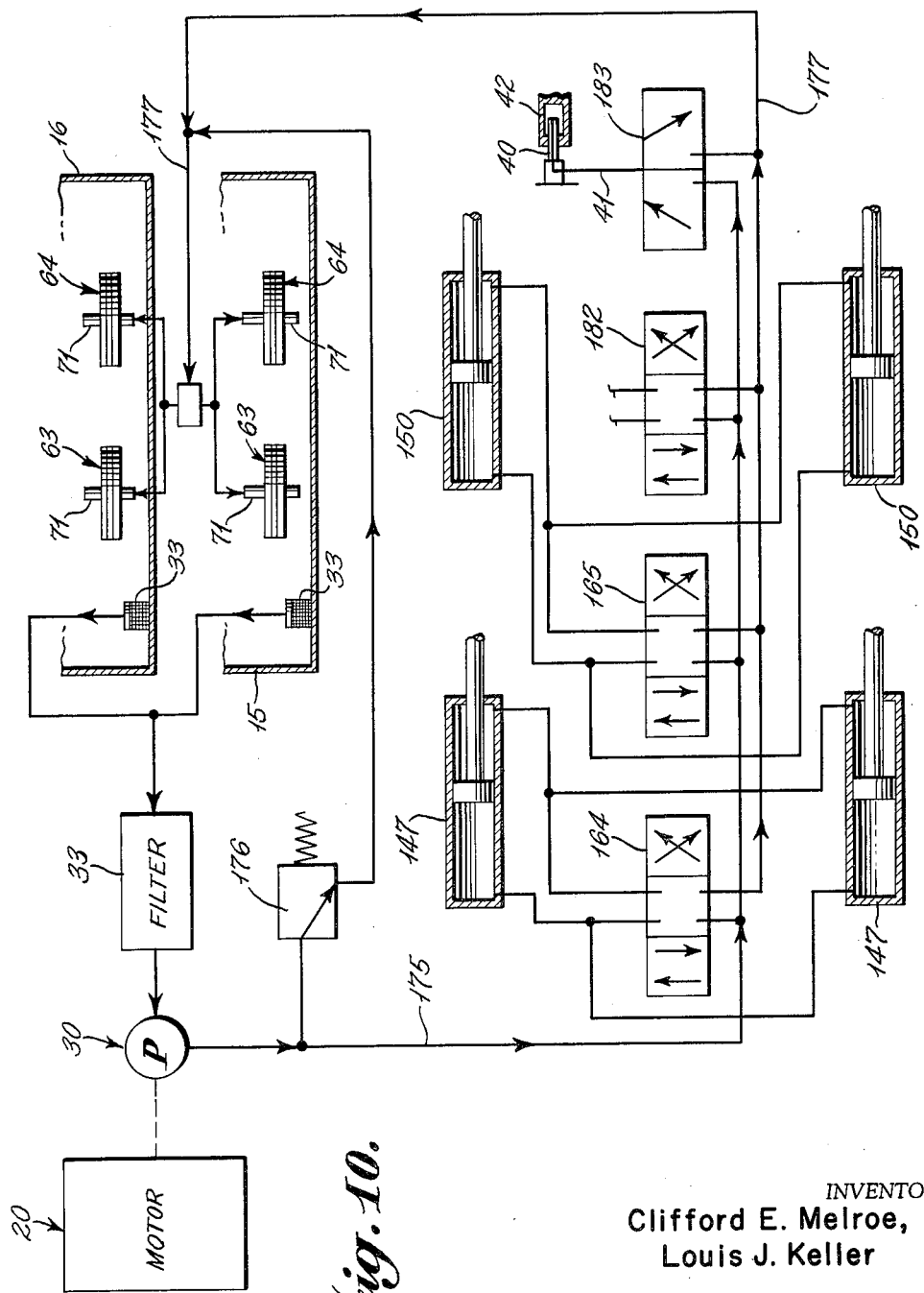

United States Patent Office 3,231,117
Patented Jan. 25, 1966

3,231,117
TRACTOR VEHICLE AND DRIVE THEREFOR
Clifford E. Melroe and Louis J. Keller, Gwinner, N. Dak.
Filed Oct. 23, 1962, Ser. No. 232,519
18 Claims. (Cl. 214—140)

The instant invention relates to the art of vehicles of the tractor type and has particular reference to such vehicles which may accommodate various attachments for handling material such as front end loaders, back hoes, dozer blades, etc. A specific feature of the invention is concerned with an improved drive for four-wheel tractor type vehicles.

There are available numerous vehicles of the tractor type constructed to perform various material handling operations by use of dozer blades, lifting forks, scoops, digging buckets, etc. Generally, these commercially available vehicles are massively constructed such as to be of such weight and size as to be serviceable in heavy duty applications including earth moving operations. The maneuverability of such vehicles is obtained, with the wheeled type, by providing a construction wherein turning movements of at least one pair of the wheels is possible or, in the crawler type, by driving one crawler track while the other track is braked. The weight of these available vehicles attributable to the components required to achieve a reasonable degree of maneuverability in and of itself necessitates providing substantial engine power for propelling the vehicle even aside from the power required to move the vehicle in performing its intended material handling functions. This requirement for a sizable power plant, requires heavy transmissions and differentials for the vehicle all adding weight and limiting the vehicle size to a minimum below which the sheer space requirements for the engine, transmission and differential prevent size reduction. The size and weight requirements for these vehicles inherently reduce their maneuverability and render them unsuitable for many relatively small handling operations such as where materials up to about 1000 pounds are to be worked with.

In the presently available tractor vehicles, the size, weight and power requirements in themselves contribute substantially to the cost of construction of such vehicles. Certainly the transmission of substantial power from the engine to propel the vehicle gives rise to the necessity for costly transmissions embodying numerous expensive gear trains and associated parts.

It is a principal object of the instant invention to provide an improved tractor vehicle of relatively simple and inexpensive construction with accompanying minimum size and weight for the vehicle thus permitting excellent maneuverability and the capability of readily handling loads of relatively small size.

Another object of the invention resides in the provision of an improved tractor vehicle of compact construction having pairs of driven wheels on opposite sides of the vehicle with the wheels of each pair being driven simultaneously but with readily controllable independent driving of the pairs thereby promoting ease of turning and maneuvering in use of the vehicle in material handling operations.

A further object in accordance with the preceding object resides in providing a drive for the vehicle with clutches provided to independently drive each pair of wheels selectively in opposite directions and also providing that, within a predetermined range, infinite variation in the driving speed of the pairs of wheels can be had to best utilize the power output of the vehicle engine while it may operate at a generally uniform r.p.m.

Further, in relation to the above object, the invention embodies improvements in the drive for the pairs of wheels wherein two clutches are provided for each pair of wheels and threaded sleeve members selectively operable to alternatingly engage and disengage each clutch of the pair of clutches in achieving the desired control of the vehicle's movement by the operator.

It is also an object of the instant invention to provide a tractor vehicle of improved simplified construction wherein the vehicle body is formed by hollow enlongated compartments extending along opposite sides of the vehicle, these compartments accommodating the fuel and oil required for the vehicle and defining therebetween spaces for the engine and for the controls to be manipulated by the operator in operation of the vehicle.

Another object of the invention resides in providing the tractor vehicle with an elongated body, mounting pairs of wheels on opposite sides thereof and upstanding members at one end of the body providing pivotal supports for lifting arms of a loader attachment with the lifting arms extending parallel along the upper side edges of the body and downwardly in front of the body for connection to a material handling bucket or other component to be manipulated by using the lifting arms.

A further specific object of the invention resides in providing a tractor vehicle with extreme maneuverability wherein two pairs of wheels are mounted on opposite sides of the vehicle body with the tread width of the wheels being greater than the wheel base such that easy turning of the vehicle by simultaneously driving each of the pairs of wheels in forward and reverse directions respectively can be obtained.

The above and other more specific objects of the instant invention will become readily apparent by reference to the accompanying drawings in which a preferred embodiment is disclosed by way of example, various modifications and changes of detail thereof being contemplated within the scope of the appended claims. The tractor vehicle of the invention is fully illustrated on the accompanying drawings in which:

FIGURE 4 is a longitudinal sectional view through one side compartment of the vehicle body;

FIGURE 5 is a sectional view with parts shown in elevation taken on line 5—5 of FIGURE 4;

FIGURE 6 is a sectional view showing features of the variable speed drive for the tractor vehicle;

FIGURE 10 is a schematic diagram of the hydraulic system incorporated in the tractor vehicle.

Figure 1:
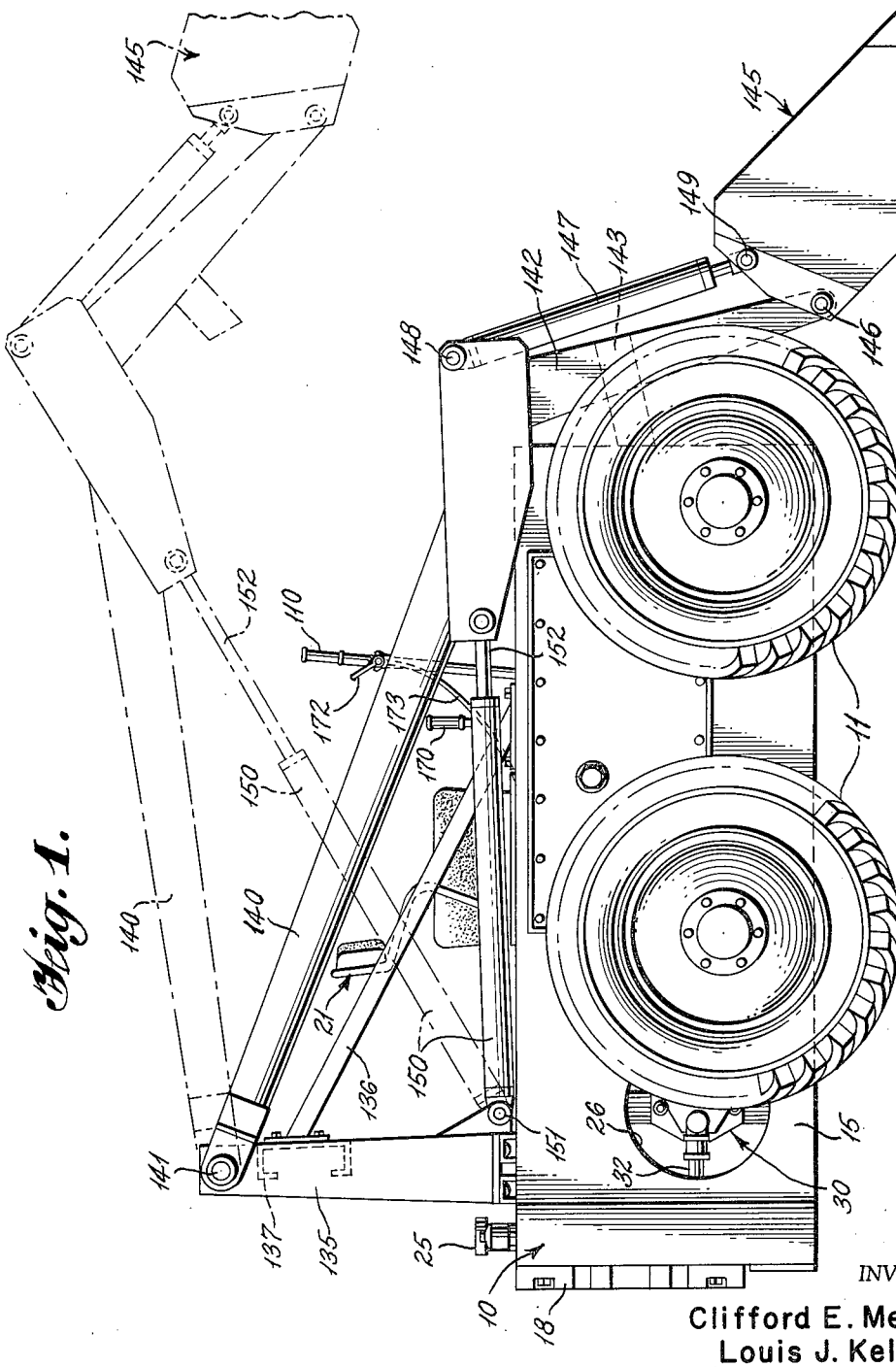
FIGURE 1 is a side elevational view of the tractor vehicle of the instant invention.
Figure 2:
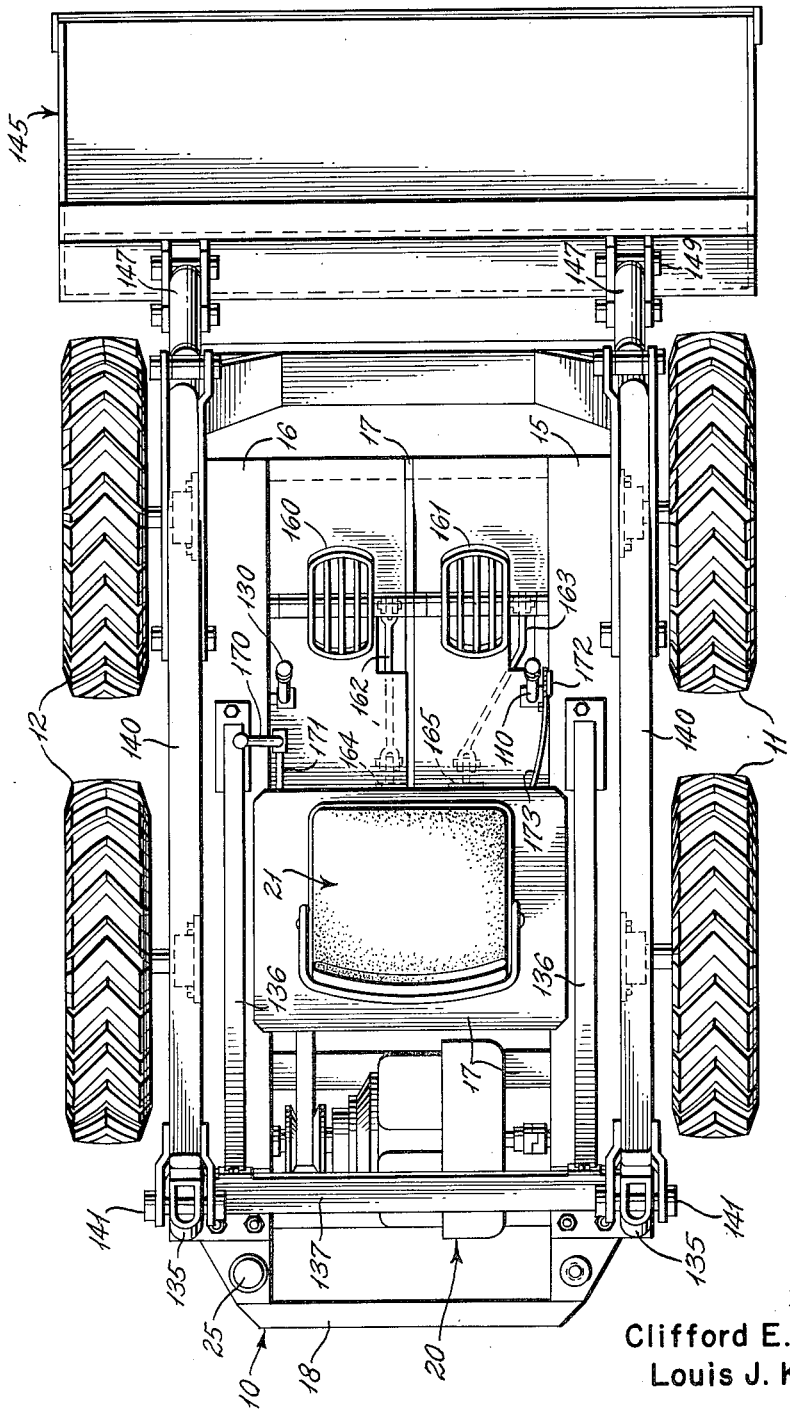
FIGURE 2 is a plan view of the vehicle shown in FIGURE 1.
Figure 3:
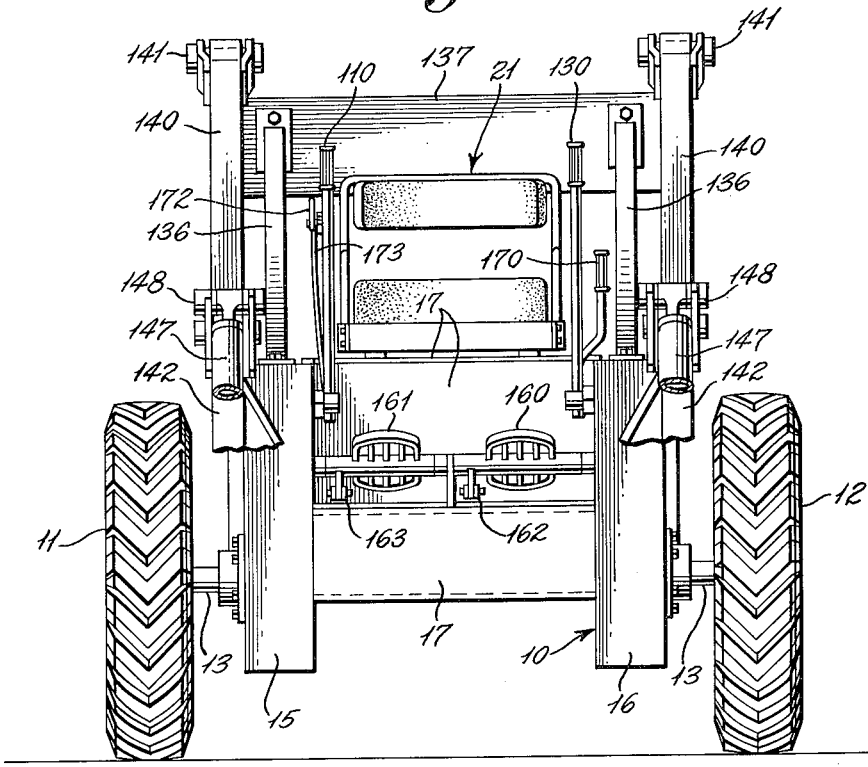
FIGURE 3 is a front elevational view of the tractor vehicle with the loader bucket and forward ends of the lifting arms cut away to facilitate illustration of the vehicle body and its construction.

Reference may be made to FIGURES 1, 2 and 3 for an overall showing of the construction of the tractor vehicle. The vehicle has an elongated generally rectangular body 10 with a pair of wheels 11 journalled at spaced positions along one side of the body and a pair of spaced wheels 12 mounted on the opposite side of the body.

Figure 9:
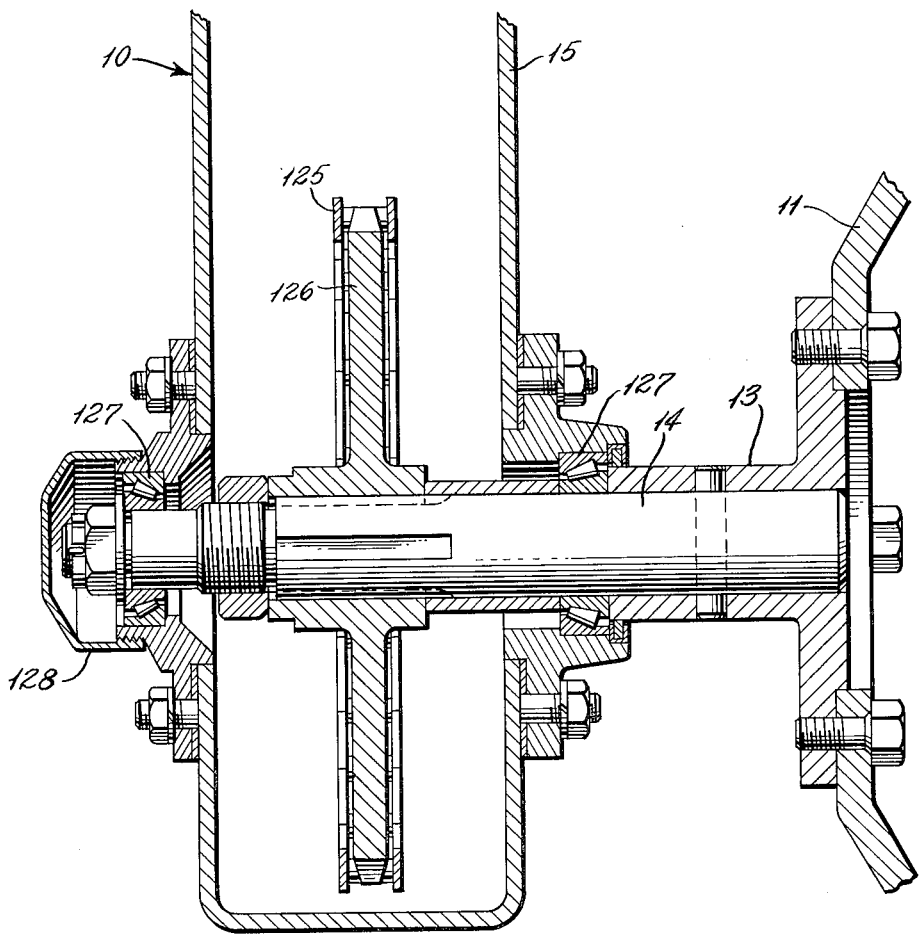
FIGURE 9 is a sectional view taken on line 9—9 of FIGURE 4.

Each of the wheels 11 and 12 consists of a generally conventional steel rim on which is mounted a heavy ribbed pneumatic tire. Attention may be particularly directed to the tires provided on the wheel rims and the tread pattern of such tires. As shown more clearly in FIGURES 2 and 3, the tread pattern provides a series of V-shaped lugs spaced around the periphery of the tire. Although a variety of different tread patterns may be employed, the tires shown are advantageous in that the lugs provide excellent gripping power for propelling the vehicle particularly over soft ground while the spaced relationship of the lugs and their V-shaped configuration permits the vehicle to be maneuvered with ease. Actually the vehicle provided with tires as shown is capable of turning about a vertical axis extending through the body 10 such that little more space for turning is required than is occupied by the vehicle's own physical dimensions. Each of the wheels 11 and 12 is suitably bolted to a hub 13 which as shown in FIGURE 9 is pinned to a stub axle 14, the axle in turn being mounted in bearings carried by the body 10.

The construction of the vehicle body 10 is of particular importance in the obtainment of light weight and economy in producing the vehicle while at the same time providing a sturdy, rigid construction which can withstand severe service conditions. The body is made up of hollow compartments 15 and 16 which extend along opposite sides of the body and are interconnected by bridging members 17, such members being disposed at spaced positions along the length of the body.

The hollow side compartments 15 and 16 may be suitably formed of sheet steel, welded into the boxlike configuration shown by the sectional views of the side compartments in FIGURES 4 and 5. The bridging members are suitably welded between the compartments to form therewith the basic frame of the vehicle body. A counterweight grill 18 preferably of cast material to offer the desired weight for stabilizing the vehicle is bolted to extend across the rear ends of the side compartments 15 and 16. This grill weight serves to stabilize the vehicle against the weight of loads elevated by the material handling attachment described hereinafter.

The construction of the body 10 including side compartments 15 and 16 and bridging members 17 is such that an engine space is provided between the compartments at the rear of the body 10. A power plant in the form of an engine 20 is mounted within this space. The engine 20 not only provides the motive power for propelling the vehicle but also, as will become apparent, drives a hydraulic pump to be used in actuating the various control components on the vehicle.

In addition to the engine space, a space is provided in the front end of body 10, this space accommodating the various control levers, pedals, etc., to be manipulated by the operator in operation of the vehicle. It may be noted that one of the bridging members 17 consists of a plate which extends between the tops of the side compartments 15 and 16 and supports a seat 21 for the vehicle operator. When positioned on the seat 21, the operator's legs extend down into the forward space containing the controls that are manipulated in operating the vehicle.

Several important advantages in the construction of the vehicle body as described above may be noted. Initially the hollow welded construction of compartments 15 and 16 extending along opposite sides of the body and tied together with the bridging members 17 offer a particularly sturdy structure for withstanding the rugged uses to which the vehicle may be put. At the same time, this rugged construction still avoids the addition of excess weight to the vehicle which would then necessitate providing substantial power merely to propel the weight of the vehicle. Secondly, the hollow side compartments 15 and 16 provide convenient receptacles for retaining the necessary supplies of fuel and oil, both lubricating oil and hydraulic oil, needed for operation of the vehicle.

A further advantage derived from the construction of the side compartments 15 and 16 lies in the fact that the spaced side walls of these compartments provide properly spaced mountings for the various shafts incorporated in the drive mechanism for the vehicle and in mounting the wheels. Also by reason of the hollow spaces in these compartments being fully enclosed, completely protected locations for the components of the drive mechanism, shaft bearings, etc., are provided and components can be properly lubricated and retained free from exposure to dust and dirt.

It may be pointed out that where a hydraulic oil suitable for lubricating the vehicle's drive mechanism is used, a single compartment to retain the necessary quantity of this oil may be provided by the full length of one side compartment such as is proposed as shown in section in FIGURE 4. On the other side of the vehicle compartment 16 may be suitably divided into sections to separate a portion of the hollow receptacle within compartment 16 into a tank for the fuel that is supplied to engine 20. A gasoline receptacle is shown in FIGURE 5 occupying the rear portion of the compartment 16, this receptacle having a filler cap 25. The engine 20 is appropriately connected to the gasoline receptacle to draw fuel therefrom.

The rearward end portions of the side compartments 15 and 16 are each provided with a cylindrical wall 26, this wall bridging the side walls of the respective compartments and placing the opposite sides of the engine space in communication with the exterior of the vehicle. These cylindrical walls provide for circulation of cooling air into the engine space and as illustrated the shaft 27 of the enginge 20 extends from both sides of the engine with its axis coinciding with the axis of cylindrical walls 26.

The opening provided by wall 26 in compartment 15 has a suitable hydraulic oil pump 30 mounted therein as best shown in FIGURES 1, 4 and 5. The drive shaft of this pump is connected by a coupling 31 to the shaft 27 of engine 20 whereby the pump is continuously driven during operation of engine 20.

Referring to FIGURE 4, it will be seen that the pump 30 has its intake 32 extending into the oil receptacle in compartment 15 to draw oil from the supply retained in this receptacle through an appropriate filter 33 connected to intake 32. The output of pump 30 is conducted to the various components associated with the vehicle controls and incorporated in the hydraulic system on the vehicle as shown in the schematic view of FIGURE 10 which will be described subsequently.

The end of shaft 27 extending from engine 20 opposite oil pump 30 has mounted thereon an adjustable sheave 35 which is engaged by a V-belt 36, the belt transmitting driving power from the engine 20 to parts in the power transmission train described hereinafter.

The construction of the adjustable sheave 35 may be best seen by reference to FIGURES 5 and 6. One flanged section 37 of the sheave is keyed and fixedly mounted on engine shaft 27. The other flanged section 38 of the sheave is axially movable relative to section 37 but suitably splined or keyed to rotate with section 37. A member 39 is mounted extending across the outer end of the opening formed by wall 26 in compartment 16. This member carries a piston 40 which is axially bored and connected to communicate with a hydraulic supply line 41. The piston 40 extends into a cavity 42 formed in the outer end of the sheave section 38 with piston 40 axially aligned with the axis of rotation of the engine shaft 27.

Also as shown in FIGURES 5 and 6, the belt 36 is trained over a split pulley 45, this pulley being secured to a jack shaft 46 by a suitable pin shown in the form of bolt 47. The halves of the split pulley 45 are axially movable on pins 48 with the two halves being biased toward each other by a compression spring 49.

The adjustable sheave 35 and the split pulley 46 over which the V-belt 36 is trained provide a variable speed drive whereby, within a predetermined speed range, changes in the relative rotative speeds between engine shaft 27 and jack shaft 46 may be effected. Thus engine 20 may be operated at essentially continuous optimum speed and the actual speed of the vehicle adjusted in relation to the power required to propel the vehicle in performing the particular chore being carried out.

In obtaining adjustment of the relative rotative speeds between the engine and jack shafts, the continuous biasing of the halves of split pulley 45 urges the belt 36 to ride as far out on the split pulley as the length of the belt will permit consistent with the spacing between the sections of sheave 35. The tension on the belt created by the forces imparted thereto from pulley 45 tends to draw the belt into sheave 35 and thus press the sheave sections apart. By introducing or releasing hydraulic fluid through line 41 into cavity 42 the sheave sections 37 and 38 may be brought together or permitted to move apart. As is well understood in belt drives, the relative rotative speeds between two belt driven shafts is determined by the relationship between the diameters of the pulleys over which the driving belt is trained. It follows that by the adjustment of sheave 35, the relationship of the diameter of belt 36 passing around sheave 35 to the belt's diameter passing around pulley 45 will be altered and accordingly an appropriate speed change may be obtained. This drive in effect provides for an infinite variation in the relative shaft speeds within a predetermined range of speeds.

The jack shaft 46 to which pulley 45 is secured extends across the engine space and through the opposed inner walls of the compartments 15 and 16. Suitable bearings 55 are mounted on the walls of compartments 15 and 16 to rotatably support the jack shaft where it extends through these walls. The ends of the jack shaft terminate within the hollow compartments 15 and 16 with each end having fastened thereto a chain sprocket 56.

The transmission of driving power from the jack shaft 46 to the pairs of wheels 11 and 12 may best be understood by reference to the sectional view shown in FIGURE 4. A sprocket chain 60 is drivingly engaged with the sprocket 56 located in compartment 15 as mounted on one end of jack shaft 46. This chain engages with sprockets 61 and 62 each sprocket being carried by one clutch plate of clutches 63 and 64 respectively. To maintain proper tension on the chain 60, an idler sprocket 65 is adjustably fastened on the sidewall of compartment 15 in a holder 66 so that the idler sprocket may be moved toward or away from the chain and thereafter locked in position to take up the chain slack as may be needed.

Each of the clutches 63 and 64 are of identical construction except for their actuators. The difference in the clutch actuators will be explained following description of the clutch construction which is shown in section in FIGURE 7.

Figure 7:
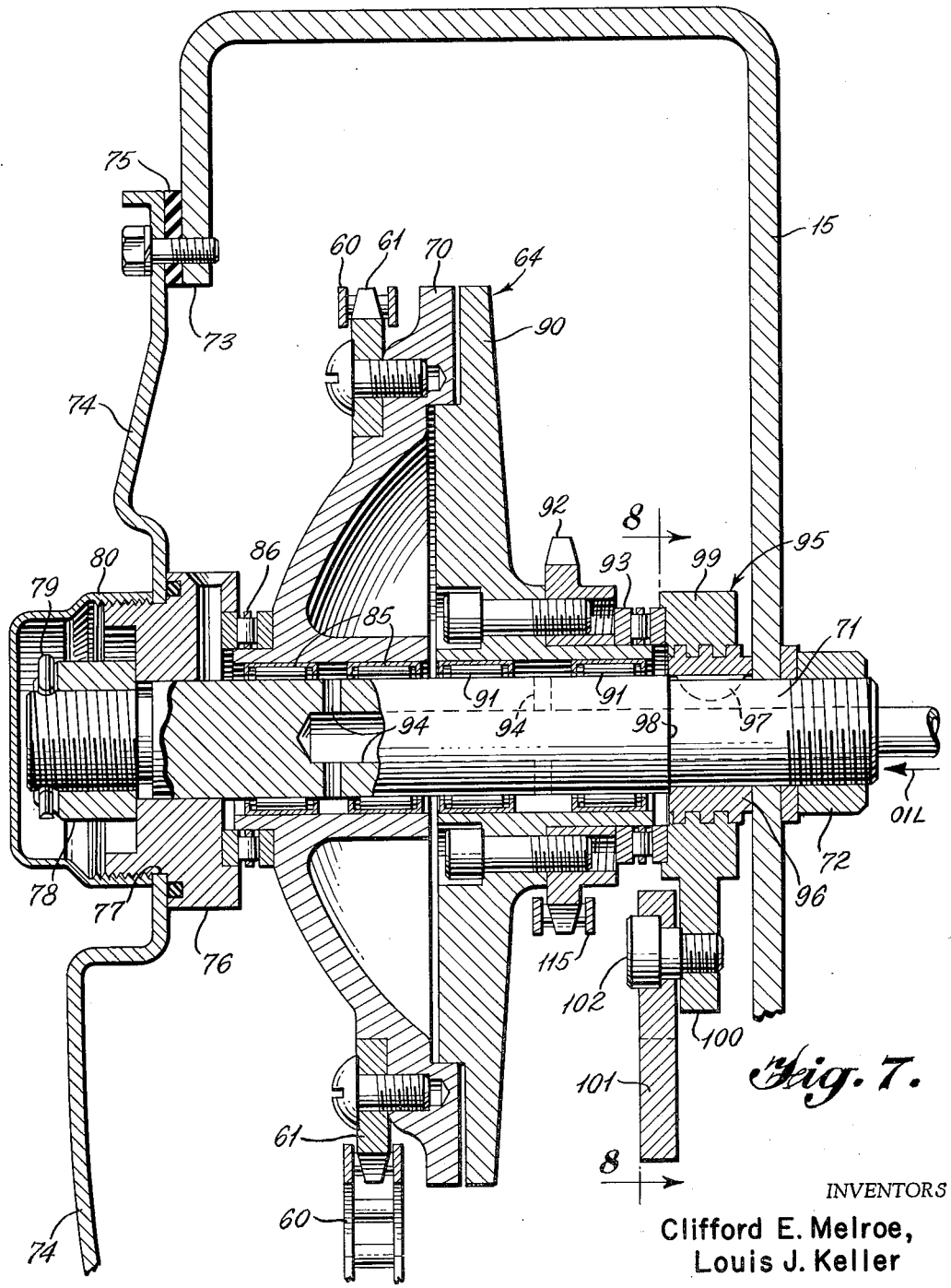
FIGURE 7 is a sectional view taken on line 7—7 of FIGURE 4.

In FIGURE 7, the sprocket 61 engaged by chain 60 is shown bolted to plate 70 which forms one of the clutch plates of clutch 64. A stub shaft 71 is secured by nut 72 to the inner wall of compartment 15. The outer wall of compartment 15 is provided with an opening 73 which is normally closed by a cover 74, bolted in place with a suitable sealing gasket 75 encircling the juncture of the cover with the perimeter of opening 73 to seal against the entrance of foreign matter into compartment 15 and to prevent leakage of oil from the compartment.

The outer end of stub shaft 71 extends through a bushing 76 which is received in an aperture 77 formed in the cover 74. A nut 78 is threaded onto the end of shaft 71 and held in place by a suitable cotter pin 79. A protective cover 80 is threaded onto bushing 76 to cover the exposed end of shaft 71 and also further fasten the cover 74 and bushing 76 together.

The clutch plate 70 is rotatably supported on stub shaft 71 by roller bearings 85, with a thrust bearing 86 mounted between the opposed radial faces of plate 70 and bushing 76. A second clutch plate 90 is mounted on stub shaft 71 by roller bearings 91 and a sprocket 92 is bolted on the hub of clutch plate 90 with a thrust bearing 93 disposed between the opposed radial faces of the sprocket 92 and the clutch actuator 95.

It may be noted at this point that the stub shaft 71 is axially bored and radially drilled to provide passages 94. These passages are supplied with oil to promote effective lubrication of bearings 85, 86, 91 and 93 and also flush the surfaces of the clutch plates 70 and 90, all as will be explained in detail hereinafter in connection with the vehicle hydraulic system.

It will be understood that the construction of clutch 63 is identical to the construction described above with reference to clutch 64. Driving energy supplied from jack shaft 46 through chain 60 is effective to drive the clutch plate 70 of both clutches 63 and 64 with both of these clutch plates being driven in the same direction by chain 60. The clutch actuators 95 for the two clutches are similar but differ in that they are designed and interconnected for operation to release one clutch while the other is engaged and vice versa.

Each clutch actuator includes an externally threaded sleeve 96 which is keyed to stub shaft 71 by a Woodruff key 97 and further clamped against rotation by being held between shoulder 98 on shaft 71 and the wall of compartment 15 when nut 72 is tightened.

An internally threaded nut 99 is threadably engaged with sleeve 96. This nut provides an annular radial face which engages with thrust bearing 93 and upon rotation of the nut in a direction to unthread it from sleeve 96, movement will occur to urge the two clutch plates 70 and 90 into driving engagement. Reverse rotation of nut 99 will, in turn, thread the nut 99 back onto sleeve 96 whereupon release of the clutch plates from driving engagement will occur.

Figure 8:
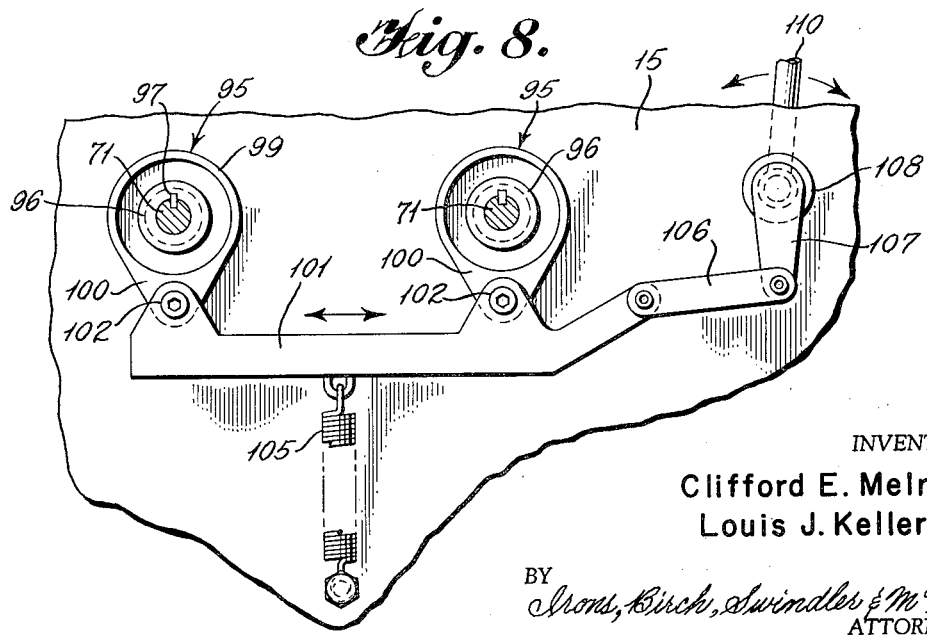
FIGURE 8 is a view taken on line 8—8 of FIGURE 7 with parts shown in section.

A tab 100 extends radially outwardly from each nut 99 to which an actuating link 101 is pivotally connected by a cap screw 102. As shown in FIGURE 8, the link 101 interconnects the tabs 100 on the nuts 99 of both clutch actuators 95. A tension spring 105 is connected between link 101 and the wall of compartment 15, positioned to draw the tabs 100 downwardly to normally assume the position as shown in FIGURE 8. A connector 106 is pinned to one end of link 101 and pinned to one arm 107 of a crank which is pivotally mounted in a bearing 108. The other arm of this crank forms a control lever 110 disposed in the forward space of the vehicle body with the lever extending upwardly to be manually engaged by the vehicle operator in effecting engagement and disengagement of the clutches to drive the pair of wheels 11 journalled on compartment 15 of body 10.

Actuator 95 for clutch 63 differs from the actuator for clutch 64 in the fact that the threaded connection between the sleeve 96 and nut 99 in one actuator has a left hand thread while the threaded connection for the other actuator has a right hand thread. In the normal position to which link 101 urges tabs 100 by the action of spring 105, both nuts 99 will be adjusted to be retracted away from the clutch plates such that the clutch plates 70 and 90 in both clutches 63 and 64 are disengaged.

When control lever 110 is shifted in one direction, the link 101 is shifted, whereupon the right hand threads in one actuator cause the actuator to press the clutch plates into driving engagement. At the same time, the left hand threads of the other actuator move the nut 99 to further retract it away from a direction which would actuate the clutch. When the lever 110 is moved in the opposite direction from the normal position shown in FIGURE 8, the left hand threaded actuator moves to engage its clutch while the right hand actuator threaded nut moves away from a direction which would engage its clutch.

To utilize the driving energy through one or another of the clutches 63 and 64, a chain 115 is trained over sprocket 92 in clutch 63 and under sprocket 92 in clutch 64. This chain passes around a large chain sprocket 116 journalled on a stub shaft 117 and drivingly coupled to prime drive sprockets 118. To retain the chain 115 in proper driving engagement with the sprockets 92 and 116, a tensioning idler sprocket 119 is provided mounted on a holder 120, pivotally secured to the wall of compartment 15 on a stud 121. The holder 120 is adjustable to appropriately tension chain 115 by rotation of a cam disc 122 acting against a flange 123 on holder 120. When properly adjusted, the holder 120 may be locked in place by tightening a bolt 124.

The stub shaft 117, carrying sprockets 116 and 118 extends between and is mounted in the opposite walls of the compartment 15. The two sprockets 118 provide the power output connection for transmitting power to the pair of wheels associated with the drive mechanism. Each sprocket 118 is engaged by a chain 125. Each chain 125 is trained over a sprocket 126, which is keyed to one of the stub axles 14. As referred to hereinabove, the stub axles extend out of the body compartment and mount the wheel hubs (see FIGURE 9).

Referring to FIGURE 9, the drive chain 125, cooperating with the sprocket 126 for one of the vehicle wheels, is shown in section. Stub axle 14 to which sprocket 126 is secured and keyed is journalled in roller bearings 127 respectively mounted in the opposite walls of compartment 15. Appropriate seals will be provided outwardly of the bearings 127 along with a dust cover 128 to preclude loss of oil from the compartment 15, which compartment forms a receptacle for oil storage as well as retaining the oil to lubricate the drive mechanism.

It will be readily recognized that the drive mechanism and control lever therefor which have been described with reference to the parts located in compartment 15 are operable to obtain simultaneous driving of the pair of wheels 11 either in forward or rearward direction depending upon the direction of movement of control lever 110 by the operator. A similar drive mechanism is provided in compartment 116 to effect simultaneous forward or reverse driving of the wheels 12 depending upon the direction of movement of a manual control lever 130. Control lever 130 is also mounted in the forward space of the vehicle body where the operator can conveniently grasp one lever 110 and 130 in each hand and swing the levers individually forwardly or backwardly to obtain the desired propelling of the vehicle. The action of lever 130 in imparting driving power to wheels 12 is, of course, identical to that described above with respect to actuation of lever 110 in coupling driving power to wheels 11.

Before turning to a description of the hydraulic system incorporated in the tractor vehicle, description may be given of the particular material handling attachment shown on the drawings in association with the tractor vehicle. As illustrated, an attachment commonly referred to as a front end loader is associated with the vehicle. However, a variety of different attachments may be used, all within the contemplation of appended claims, the various attachments being usually substituted for the attachment as illustrated. For example, the scoop type bucket shown on the attachment may be replaced by lifting forks to handle pallets or other stacked material in warehouse use of the vehicle. As another example, the bucket may be replaced with a dozer blade, particularly for use in earth moving operations. The illustrated scoop type bucket or the attachment as a whole may be removed and a snow-throwing mechanism mounted on the forward end of the vehicle. Other adaptations in use of the compact, readily maneuverable vehicle such as adaptation of a back hoe and other types of equipment commonly used with tractor type vehicles may also be employed if desired.

The material handling attachment shown on the drawings includes a pair of spaced stanchions 135 bolted to the rear end of body 10 and braced by diagonal braces 136 secured at their forward ends to the top surfaces of compartments 15 and 16 respectively. The upper ends of stanchions 135 are tied together by a beam 137. Lifting arms 140 are pivotally connected to the upper ends of stanchions 135 by means of pins 141. These arms extend forwardly and downwardly along the opposite sides of the body 10 with a terminal portion 142 of each arm extending downwardly in front of the body 10 in the lowered position as shown in FIGURE 1. A rest member 143 may be provided extending rearwardly from portion 142 of each arm to engage against the front face of compartments 15 and 16 for the respective arms 140 to define the fully lowered position for the arms.

A material handling bucket 145 is pivotally connected at 146 to the lowermost ends of the portions 142 of arms 140. Control of the position of bucket 145 relative to the portions 142 is obtained by means of a pair of hydraulic cylinder actuators 147 with the cylinder of each pinned at 148 to the arm 140 with which it is associated and the piston rod pinned to the bucket at 149.

The load lifting action carried out in utilization of the attachment is obtained by a pair of hydraulic cylinder actuators 150, one actuator being provided for each arm 140. With respect to each arm, the actuator 150 has its cylinder pinned at 151 adjacent the base of one of the stanchions 135 and the piston rod 152 pinned to arm 140.

In manipulation of the material handling apparatus which has been described, introduction of hydraulic fluid into actuators 150 will raise the lifting arms 140 and the bucket 145 attached thereto to the position shown in phantom on FIGURE 1 or to higher positions depending upon the limit of extension of actuators 150. Upon release of fluid from actuators 150 the arms 140 will be lowered. For picking up and dumping material from the bucket 145 or for maintaining the bucket level during raising of the lifting arms 140, the actuators 147 may be extended or retracted by appropriate introduction or release of hydraulic fluid from actuators 147 as may be necessary.

As shown in FIGURES 2 and 3, pedals 160 and 161 are mounted to be rockable about a shaft extending transversely of the forward space in body 10 and adjacent the floor of the space in a position to be conveniently engaged by the feet of the operator seated on seat 21. These pedals are individually connected by links 162 and 163 to operate control valves 164 and 165 which are schematically shown on the hydraulic system diagram of FIGURE 10.

Also mounted in the forward space of the vehicle body is a control lever 170. This lever is provided to permit adjustment of the setting of the above described variable speed drive by controlling the introduction or release of hydraulic fluid from chamber 42 associated with the adjustable sheave 35. The lower end of the lever makes connection through a link 171 with a control valve shown schematically on the hydraulic system diagram of FIGURE 10. To provide for control of the speed of engine 20, a suitable throttle lever 172 connected through a flexible cable 173 to the engine carburetor may be conveniently mounted adjacent the upper end of control lever 110.

Referring to the hydraulic system shown schematically in FIGURE 10 many of the elements have been described heretofore and the reference numerals appearing on FIGURE 10 correspond to the numerals employed in describing the corresponding parts above.

The hydraulic oil pump 30 driven by engine 20 withdraws oil from the sumps provided by the oil receptacles in compartments 15 and 16, this oil being drawn through the filter 33 as shown in FIGURE 4. The oil retaining receptacles in compartments 15 and 16 may be connected through a suitable tie-line to place these oil receptacles in communication.

The pump 30 supplies oil under high pressure through a line 175. In the absence of oil being needed to actuate either of the pairs of actuators 147 or 150 or to supply oil to cavity 42 in the speed changer, a spring biased pressure relief valve 176 relieves the oil pressure permitting flow of oil into line 177 through which it is fed to the passages in the shafts 171 of the four clutches 63 and 64. This oil lubricates the clutch bearings and flushes the clutch plate faces as described above and in returning to the sump within the respective compartments 15 and 16 it inherently promotes lubrication of the various sprockets, chains and bearings associated in the rest of the drive mechanisms at opposite sides of the vehicle. The high pressure oil supply in line 175 is transmitted to valves 164 and 165, 182 and 183. Valve 164 under the control of pedal 160 is operable by its connections to actuators 147 to hold the actuators in fixed position and when shifted in one direction by movement of pedal 160 to extend the actuators and when shifted by movement of the pedal to the extreme opposite position to retract the actuators. Similarly, valve 165 controlled by movement of pedal 161 will in its centered position as shown, hold the actuators 150 at a set length or when shifted in one direction extend the actuators and when shifted to the extreme in the opposite direction, retract the actuators.

Valve 182 shown in FIGURE 10 is provided as an auxiliary valve, the output of which may be suitably connected to actuate some additional component that may be desired for use with the vehicle.

Valve 183 is connected to be actuated through link 171 by the movements of the control lever 170 located in the forward control space of the vehicle body. In the position of this valve as shown on FIGURE 10, the fluid in cavity 42 is trapped such that a fixed speed setting for the variable speed drive exists. Shifting the valve in one direction will supply additional hydraulic fluid while shifting the valve in the other direction will relieve hydraulic fluid. The former shifting movement will effect an increase in the speed of rotation of jack shaft 46 for a particular engine speed while the latter will decrease the speed of shaft 46 for this same engine speed.

With respect to each of the hydraulic system valves, it will be noted that, as shown on FIGURE 10, when any one or more these valves is operated to release hydraulic fluid from the component that the valve controls, the released fluid will be returned to the oil supply in compartments 15 and 16 through line 177. Thus all fluid supplied to components such as actuators 147 and 150 and thereafter released in manipulative operation of the components passes through the passages in clutches 63 and 64 to promote their lubrication and lubrication of the various chain drives in the drive mechanisms.

It is to be understood that the form of the invention herein shown and described is to be taken only as a preferred example of the same and that various changes in size, shape and arrangement of parts, etc., may be resorted to without departing from the spirit of the invention or the scope of the appended claims.

We claim:
1. In a tractor vehicle having an engine and a pair of ground engaging wheels on each side of the vehicle with clutch means for each pair of wheels to selectively connect the engine to propel the vehicle, each of said clutch means comprising
   a first and a second clutch with each clutch having input plate means and output plate means rotatable about a common axis,
   means connecting the input plate means of each clutch to be driven by the engine,
   means connecting the output plate means of each first clutch to drive at least one of the pair of wheels with which the clutch means is associated in a first direction,
   means connecting the output plate means of each second clutch to drive at least one of the pair of wheels with which the clutch means is associated in a second direction,
   an actuator for each clutch disposed to move the plate means into driving relationship including threadably engaged externally threaded and internally threaded elements,
   one of said elements being fixed and the other of said elements being movable,
   the threads on said elements of said first and second clutches being right and left hand threads respectively,
   and movable control means interconnecting said movable elements of said first and second clutches.

2. In a tractor vehicle with clutch means as recited in claim 1 wherein the wheels of each pair of wheels are coupled to be driven simultaneously and the output plate means of said clutches drive both wheels of the pair with which the clutch means is associated.

3. In a tractor vehicle with clutch means as recited in claim 1 wherein said movable control means includes a shiftable link connected between the movable elements of said first and second clutches, and a control lever coupled to said link and manipulatable by the vehicle operator to coordinate actuation of said clutches.

4. In a tractor vehicle having an engine and a pair of ground engaging wheels on each side of the vehicle with clutch means for each pair of wheels to selectively connect the engine to propel the vehicle, each of said clutch means comprising
   a first and a second clutch with each clutch having input plate means and output plate means rotatable about a common axis,
   variable speed drive means connecting the input plate means of each clutch to be driven by the engine and providing within a predetermined range for infinitely variable change of speed in the relative rotative speeds between the drive shaft of the engine and the inputs to said clutches,
   means connecting the output plate means of each first clutch to drive at least one of the pair of wheels with which the clutch means is associated in a first direction,
   means connecting the output plate means of each second clutch to drive at least one of the pair of wheels with which the clutch means is associated in a second direction,
   an actuator for each clutch disposed to move the plate means into driving relationship including threadably engaged externally threaded and internally threaded elements,
   one of said elements being fixed and the other of said elements being movable,
   the threads on said elements of said first and second clutches being right and left hand threads respectively,
   and movable control means interconnecting said movable elements of said first and second clutches.

5. A tractor vehicle adapted to mount a material handling attachment for use in conjunction with the vehicle comprising
   a vehicle body supporting an engine for propelling the vehicle,
   a pair of spaced ground engaging wheels rotatably mounted at each side of said body,
   drive means interconnecting the wheels of each pair to be rotatable simultaneously to propel and maneuver the vehicle,
   clutch means including first and second clutches for each pair of wheels,
   each clutch having input plate means and output plate means,
   means connecting the input plate means of each clutch to be driven by the engine,
   means connecting the output plate means of each first clutch to said drive means to drive at least one of the pair of wheels with which the clutch means is associated in a first direction,
   means connecting the output plate means of each second clutch to said drive means to drive at least one of the pair of wheels with which the clutch means is associated in a second direction,
   an actuator for each clutch disposed to move the plate means into driving relationship including threadably engaged externally threaded and internally threaded elements,
one of said elements being fixed and the other of said elements being movable,
the threads on said elements of said first and second clutches being right and left hand threads respectively,
and movable control means interconnecting said movable elements of said first and second clutches.

6. A tractor vehicle adapted to mount a material handling attachment for use in conjunction with the vehicle comprising
a vehicle body supporting an engine for propelling the vehicle,
a pair of spaced ground engaging wheels rotatably mounted at each side to said body,
drive means connecting the wheels of each pair to be rotatable simultaneously to propel and maneuver the vehicle,
clutch means including first and second clutches for each pair of wheels,
each clutch having input plate means and output plate means,
variable speed drive means connecting the input plate means of each clutch to be driven by the engine and providing within a predetermined range for infinitely variable change of speed in the relative rotative speeds between the drive shaft of the engine and the inputs to said clutches,
means connecting the output plate means of each first clutch to said drive means to drive at least one of the pair of wheels with which the clutch means is associated in a first direction,
means connecting the output plate means of each second clutch to said drive means to drive at least one of the pair of wheels with which the clutch means is associated in a second direction,
an actuator for each clutch disposed to move the plate means into driving relationship including threadably engaged externally threaded and internally threaded elements,
one of said elements being fixed and the other of said elements being movable,
the threads on said elements of said first and second clutches being right and left hand threads respectively,
and movable control means interconnecting said movable elements of said first and second clutches.

7. A tractor vehicle for use in handling material comprising
an elongated vehicle body supporting adjacent the rear end of said body an engine for driving the vehicle,
a seat for the operator mounted on said body intermediate the ends thereof and forwardly of said engine,
spaced wheels rotatably mounted on opposite sides of the body,
means for connecting said engine to selectively drive said wheels in forward or reverse directions to propel and maneuver said vehicle,
said means including first and second clutches for the wheels on each side of said body,
means connecting the inputs of said clutches to be driven by said engine,
each said first clutch being engageable to connect said engine to rotate the wheels with which it is associated in a first direction,
each said second clutch being engageable to connect said engine to rotate the wheels with which it is associated in a second direction,
an actuator for each clutch including first and second relatively rotatable elements,
said first element having arcuate threadlike portions thereon and said second element carrying means engageable with said threadlike portions such that relative rotation between said elements causes axial separation of said elements and resultant actuation of the clutch with which the actuator is associated,
movable control means interconnecting said elements of said first and second clutches,
said body having stanchion means projecting upwardly from adjacent the rear end of said body and providing at the upper end thereof a pivotal mounting,
parallel arms connected to said pivotal mounting and extending forwardly along said body and downwardly adjacent the front end of said body,
a material handling member mounted on the forward ends of said arms,
and an extensible actuator for each arm connected to raise said arms and the material handling member mounted thereon in connection with use of the vehicle.

8. A tractor vehicle for use in handling material as recited in claim 7 wherein said material handling member comprises a scoop type bucket pivotally connected to the forward ends of said arms, and extensible actuator means connected between each of said arms and the bucket to control the positioning of said bucket relative to said arms.

9. A tractor vehicle for use in handling material comprising
an elongated vehicle body having an engine space at the rear end thereof and a forward space for the vehicle operator's legs at the front end thereof with a seat for the operator mounted on said body intermediate and at an elevation above said engine space and said forward space,
an engine mounted in said engine space,
spaced wheels rotatably mounted on opposite sides of the body,
means for connecting said engine to selectively drive said wheels in forward or reverse directions to propel and maneuver said vehicle,
a stanchion projecting upwardly from adjacent the rear end of said body on each side of said engine space and providing at the upper end thereof a pivotal mounting,
a lifting arm connected to said pivotal mounting of each stanchion with each arm extending forwardly along a side of said body past said operator's seat and downwardly adjacent the front end of said body,
a material handling member mounted on the forward ends of said arms,
and means connected to each arm to raise said arms and the material handling member mounted thereon in connection with use of the vehicle.

10. A tractor vehicle for handling material comprising
a vehicle body including hollow spaced side compartments extending along opposite sides of the body,
said compartments being connected by bridging members disposed to define an engine space between said compartments adjacent the rear of said body and a forward space between said compartments adjacent the front of said body,
an operator's seat supported between said engine space and said forward space to dispose the operator's legs to extend into said forward space,
a material handling attachment including parallel arms pivotally connected to said vehicle body and extending along the opposite sides of said spaces with a material handling member mounted on the forward ends of said arms,
means connected to said arms to raise and lower said attachment in effecting material handling,
said forward space having controls therein for manipulation of said tractor vehicle by its operator,
and each of said compartments providing a receptacle to accommodate liquid supplies required in operation of said vehicle.

11. A tractor vehicle for handling material comprising
a vehicle body including hollow spaced side compartments extending along opposite sides of said body, said compartments being connected by bridging members disposed to define an engine space between said compartments at the rear of said body and a forward space between said compartments at the front of said body, an engine in said engine space, a pair of stub axles journalled in the outer wall of each of said compartments and extending horizontally outwardly therefrom, a ground engaging wheel secured to the outwardly extending portion of each stub axle, power transmitting means enclosed within each compartment and coupled to the engine and the portion of said stub axles disposed between the compartment walls to transmit driving power from said engine to said stub axles, an operator's seat supported between and at an elevation above said engine space and said forward space to dispose the operator's legs to extend into said forward space, stanchion means projecting upwardly from adjacent the rear end of said body and providing at the upper end thereof a pivotal mounting, parallel arms connected to said mounting and extending forwardly along said body generally above said compartments respectively and then downwardly adjacent the front end of said body, a material handling member mounted on the forward end of said arms, means connected to raise and lower said arms with the material handling member thereon, said forward space having controls therein for manipulation of said tractor vehicle by its operator, and each compartment providing a receptacle ot retain lubricating fluid for continuous lubrication of the power transmitting means enclosed within the compartment.

12. A tractor vehicle as recited in claim 11 wherein at least one of said compartments includes a receptacle to retain a quantity of fuel for said engine.

13. A tractor vehicle for handling material comprising a vehicle body including hollow spaced side compartments extending along opposite sides of the body, said compartments being connected by bridging members disposed to define an engine space between said compartments adjacent the rear of said body and a forward space between said compartments adjacent the front of said body, an operator's seat supported between said engine space and said forward space to dispose the operator's legs to extend into said forward space, stanchion means projecting upwardly from adjacent the rear end of said body and providing at the upper end thereof a pivotal mounting, parallel arms connected to said pivotal mounting and extending forwardly along said body generally above said compartments respectively and then downwardly adjacent the front end of said body, a material handling member mounted on the forward ends of said arms, means connected to raise and lower said arms with the material handling member thereon, said forward space having controls therein for manipulation of said tractor vehicle by its operator, and each compartment providing a receptacle to accommodate liquid supplies required in operation of said vehicle.

14. A tractor vehicle for handling material as recited in claim 13 wherein said material handling member is a scoop type bucket pivotally mounted on said arms with means connected to the bucket to control its position relative to said arms, and said controls include rockable pedals mounted in said forward space to be engaged by the operator's feet and moved in performing manipulations of said lifting arms and bucket.

15. A tractor vehicle for handling material comprising a vehicle body including hollow spaced side compartments extending along opposite sides of said body, said compartments being connected by bridging members disposed to define an engine space between said compartments at the rear of said body and a forward space between said compartments at the front of said body, an engine in said engine space, a pair of stub axles journalled in the outer wall of each of said compartments and extending horizontally outwardly therefrom, a ground engaging wheel secured to the outwardly extending portion of each stub axle providing front wheels adjacent the front end of said body and rear wheels adjacent the rear end of said body, said front wheels being rotatable on an axis common to each other and said rear wheels being rotatable on an axis common to each other, said wheels on the opposite sides of said body being spaced a greater distance apart than the spacing between said common axes, drive means interconnecting the axles of each pair to be rotatable simultaneously, clutch means for each pair of axles enclosed within the compartment with which the pair of axles is associated, each clutch means including first and second clutches, means connecting the inputs of said clutches to be driven by said engine, said first clutch of each clutch means being engageable to connect said engine to rotate the axles with which it is associated in a first direction, said second clutch of each clutch means being engageable to connect said engine to rotate the wheels with which it is associated in a second direction, an actuator for each clutch including first and second relatively rotatable elements, said first element having arcuate threadlike portions such that relative rotation between said elements causes axial separation of said elements and resultant actuation of the clutch with which the actuator is associated, movable control means interconnecting said elements of said first and second clutches, and means connected to said movable control means extending out of each compartment and disposed in said forward space for manipulation in separately actuating each of said clutch means to drive said axles.

16. A tractor vehicle for handling material as recited in claim 15 wherein said connecting means includes variable speed drive means providing within a predetermined range for infinitely variable change of speed in the relative rotative speeds between the drive shaft of said engine and the inputs of said clutch means, and means connected to said variable speed drive means for selectively adjusting said variable speed drive means within said range.

17. A tractor vehicle for use in handling material as recited in claim 9 wherein each of said lifting arms includes a first portion extending downwardly and forwardly toward the front end of said body and a second portion disposed at an angle to said first portion and extending downwardly adjacent the front end of said body in the lowered position of the arms, and said last named means consists of an extensible actuator connected between the arm with which it is associated and a point adjacent the lower end of said stanchion.

18. A tractor vehicle for handling material comprising a vehicle body including hollow spaced side compartments extending along opposite sides of said body, said compartments being connected by bridging members disposed to define an engine space between said compartments adjacent the rear of said body and a forward space between said compartments adjacent the front of said body, an engine in said engine space, a pair of stub axles journalled in the spaced walls of each of said compartments and extending horizontally outwardly therefrom, a ground engaging wheel secured to the outwardly extending portion of each stub axle, drive means interconnecting the axles of each pair to be rotatable simultaneously, clutch means for each pair of axles enclosed within the compartment with which the pair of axles is associated, each clutch means including first and second clutches, means connecting the inputs of said clutches to be driven by said engine, said first clutch of each clutch means being engageable to connect said engine to rotate the axles with which it is associated in a first direction, said second clutch of each clutch means being engageable to connect said engine to rotate the wheels with which it is associated in a second direction, each clutch having an actuator including threadably engaged externally threaded and internally threaded elements, one of said elements being fixed and the other of said elements being movable, the threads on said elements of said first and second clutches for each clutch means being right and left hand threads respectively, movable control means interconnecting said movable elements of said first and second clutches, and means extending out of each compartment and disposed in said forward space for manipulation in separately actuating each of said clutch means to drive said axles.

References Cited by the Examiner
UNITED STATES PATENTS

| | | | |
|---|---|---|---|
| 1,470,078 | 10/1923 | Hellwarth | 74—361 X |
| 1,505,371 | 8/1924 | Butler | 180—6.66 |
| 1,651,367 | 12/1927 | Blackmore | 180—6.66 |
| 2,348,899 | 5/1944 | Guignard et al. | 214—140 |
| 2,535,727 | 12/1950 | Dingley | 214—140 |
| 2,764,449 | 9/1956 | Dunham | 280—5 |
| 2,774,496 | 12/1956 | Dorkins | 214—140 |
| 2,936,840 | 5/1960 | White | 180—6.66 |
| 3,001,654 | 9/1961 | Albert | 214—131 X |
| 3,003,652 | 10/1961 | Henry | 214—140 |
| 3,017,941 | 1/1962 | Baker | 180—6.2 |
| 3,052,311 | 9/1962 | Leedom | 180—6.66 |
| 3,133,455 | 5/1964 | White | 74—720.5 |

GERALD M. FORLENZA, *Primary Examiner.*

HUGO SCHULZ, *Examiner.*

G. CRUTSINGER, R. G. SHERIDAN,
*Assistant Examiners.*